US008885304B2

United States Patent
Kato

(10) Patent No.: US 8,885,304 B2
(45) Date of Patent: Nov. 11, 2014

(54) DRIVE FORCE DISTRIBUTION CONTROL APPARATUS

(75) Inventor: Kiyoshige Kato, Chiryu (JP)

(73) Assignee: Jtekt Corporation, Osaka-shi (JP)

( * ) Notice: Subject to any disclaimer, the term of this patent is extended or adjusted under 35 U.S.C. 154(b) by 335 days.

(21) Appl. No.: 13/299,967

(22) Filed: Nov. 18, 2011

(65) Prior Publication Data

US 2012/0140364 A1    Jun. 7, 2012

(30) Foreign Application Priority Data

Dec. 7, 2010 (JP) ................................. 2010-272439

(51) Int. Cl.
| | | |
|---|---|---|
| *H02H 5/04* | (2006.01) | |
| *H02H 7/08* | (2006.01) | |
| *B60W 50/02* | (2012.01) | |
| *H02P 29/02* | (2006.01) | |
| *B60W 50/029* | (2012.01) | |

(52) U.S. Cl.
CPC ......... *H02P 29/021* (2013.01); *B60W 50/0205* (2013.01); *B60W 2720/403* (2013.01); *B60W 50/029* (2013.01)
USPC .................. 361/23; 361/29; 701/89; 180/248; 477/125

(58) Field of Classification Search
CPC ... H02H 7/093; H02H 1/0061; H02H 7/0833; H02H 7/0816; G01R 31/01; G05B 23/0251; F02P 17/00; B60W 50/0205; B60W 50/029; B60W 2720/403; B60W 10/06; B60W 10/08; B60W 20/00; G07C 5/008; Y02T 10/7077; Y02T 10/7005
USPC ...................................... 361/21, 29
See application file for complete search history.

(56) References Cited

U.S. PATENT DOCUMENTS

| | | | |
|---|---|---|---|
| 5,309,756 A | * | 5/1994 | Osawa et al. .............. 73/114.04 |
| 6,842,681 B2 | | 1/2005 | Imai et al. |
| 6,842,682 B2 | | 1/2005 | Wakao et al. |
| 7,006,899 B2 | | 2/2006 | Wakao et al. |
| 7,038,895 B2 | * | 5/2006 | Imai et al. ........................ 361/23 |
| 2003/0080746 A1 | | 5/2003 | Imai et al. |
| 2003/0226702 A1 | * | 12/2003 | Imai et al. ..................... 180/247 |
| 2004/0044459 A1 | * | 3/2004 | Wakao et al. ................... 701/69 |
| 2011/0071730 A1 | * | 3/2011 | Nakai ............................. 701/42 |

FOREIGN PATENT DOCUMENTS

JP     2003-214234 A     7/2003

OTHER PUBLICATIONS (Partial English Translation only) Office Action issued Jun. 10, 2014 in Japanese Patent Application No. 2010-272439.

* cited by examiner

*Primary Examiner* — Eduardo Colon Santana
*Assistant Examiner* — Zemenay Truneh
(74) *Attorney, Agent, or Firm* — Oblon, Spivak, McClelland, Maier & Neustadt, L.L.P.

(57) ABSTRACT

A drive force distribution control apparatus in which if a relay output voltage (Vah) detected by relay-output-voltage detecting means (30) is lower than a first threshold, the relay is repeatedly and successively turned on and off multiple times, and then if the relay output voltage (Vah) detected later by the relay-output-voltage detecting means (30) while an engine speed (Er) is higher than a second threshold and an ignition switch (IG) is on is still lower than the first threshold, it is determined that there is an abnormality that keeps the relay stuck open, and then control for switching the drive mode from a four-wheel-drive mode to a two-wheel-drive mode is executed.

4 Claims, 6 Drawing Sheets

DRIVE FORCE DISTRIBUTION CONTROL APPARATUS

INCORPORATION BY REFERENCE/RELATED APPLICATION

This application claims priority to Japanese Patent Application No. 2010-272439 filed on Dec. 7, 2010 the disclosure of which, including the specification, drawings and abstract, is incorporated herein by reference in its entirety.

BACKGROUND OF THE INVENTION

1. Field of the Invention

The invention relates to a drive force distribution control apparatus.

2. Discussion of Background

Examples of drive force distribution control apparatuses include a drive force distribution apparatus for a drive force transmission device of a four-wheel-drive vehicle. The drive force distribution control apparatus for a four-wheel-drive vehicle includes a clutch mechanism, and executes on-off control on a relay to control power distribution to an electromagnetic coil for engaging or disengaging the clutch mechanism.

The above-described drive force distribution control apparatus executes on-off control on switching means, such as a switch transistor, with the relay closed, thereby exciting or de-exciting the electromagnetic coil, which is electrically connected to a power line via the relay. When the electromagnetic coil is excited, the clutch mechanism is engaged so that torque distribution for four-wheel drive takes place.

In such a drive force distribution control apparatus, when an ignition switch (IG, power switch) is turned on, a process for detecting an abnormality of the relay is executed. The abnormalities to be detected through this process include abnormalities that cause the contacts in the relay to be stuck on each other, such as contact welding (i.e., abnormalities that keep the relay stuck closed) and abnormalities that prevent the contacts in the relay from contacting each other (i.e., abnormalities that keep the relay stuck open).

In the relay abnormality detection process described above, the relay is turned on and off several times while the ignition switch IG is on, and the voltage at a circuit connected to the relay is compared with a threshold voltage. Thus, whether there is an abnormality that keeps the relay stuck open is determined. When such an abnormality is detected as a result of turning the relay on and off several times, a failsafe process is immediately executed. For example, US2003-0080746 describes a technique in which, when an abnormality that keeps a relay stuck open is detected as a result of turning the relay on and off, the relay is immediately prohibited from being closed so that the drive mode is switched from the four-wheel-drive mode (four-wheel-drive control) to the two-wheel-drive mode (two-wheel-drive control).

However, according to this technique, the following inconvenience may occur. The voltage at the circuit connected to the relay is compared with the threshold voltage. Therefore, if the relay is turned on and off several times when the battery voltage is temporarily low due to a decrease in the ambient temperature, it may be erroneously determined that there is an abnormality that keeps the realty stuck open. In such a case, despite the fact that the detection of the abnormality is not correct, the process for prohibiting the relay from being closed is immediately executed to switch the drive mode from the four-wheel-drive mode to the two-wheel-drive mode, and the two-wheel-drive mode is thereafter maintained, that is, the drive mode is not switched back to the four-wheel-drive mode even when the battery voltage later returns to a normal level due to an increase in the ambient temperature. This may result in reduction in the stability of traveling (driving) of the vehicle depending upon the road surface condition.

SUMMARY OF THE INVENTION

The invention provides a drive force distribution control apparatus that is capable of preventing reduction in the stability of traveling (driving) of a vehicle, which may be caused when it is erroneously determined that a relay is stuck open due to a temporary decrease in the battery voltage and thus the vehicle drive mode is unnecessarily switched from the four-wheel-drive mode to the two-wheel-drive mode.

According to a feature of an example of the invention, it is possible to prevent an erroneous determination that there is an abnormality that keeps a relay stuck open from being made even when the voltage of a battery is temporarily low due to a decrease in the ambient temperature, or the like, and thereby prevent the drive mode of a vehicle from being unnecessarily switched from the four-wheel-drive mode to the two-wheel-drive mode.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereafter, an example embodiment of the invention will be described with reference to the accompanying drawings.

Figure 1:
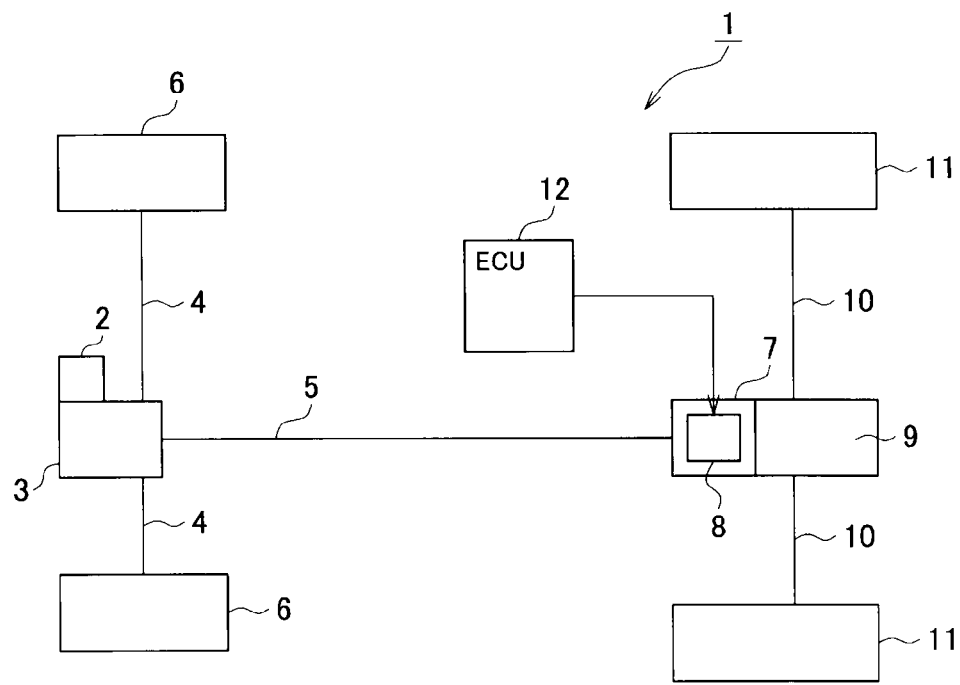
FIG. 1 is a view schematically showing the structure of a four-wheel-drive vehicle that includes a drive force distribution control apparatus according to an example embodiment of the invention.

A drive force distribution control apparatus according to the example embodiment of the invention, which is provided in a four-wheel-drive vehicle, will be described with reference to the drawings. As shown in FIG. 1, a four-wheel-dive vehicle 1 includes an engine 2 that is an internal combustion engine, and a transaxle 3. A pair of front axles 4 and a propeller shaft 5 are connected to the transaxle 3. Front wheels 6 are coupled to the respective front axles 4. A drive force transmission device (torque coupling) 7 is connected to the propeller shaft 5. A rear differential 9 is connected to the torque coupling 7 via a drive pinion shaft (not shown). Rear wheels 11 are coupled to the rear differential 9 via paired rear axles 10.

The drive force generated by the engine 2 is transmitted to the front wheels 6 via the transaxle 3 and the front axles 4. When the propeller shaft 5 and the drive pinion shaft are coupled to each other via the torque coupling 7 such that torque is transmittable therebetween, the drive force generated by the engine 2 is transmitted also to the rear wheels 11 via the propeller shaft 5, the drive pinion shaft, the rear differential 9, and the rear axles 10. Meanwhile, the drive force generated by the engine 2 rotates a power generator (not shown), and power generated by the power generator is supplied to battery 20 (refer to FIG. 2).

The torque coupling 7 includes a wet multi-plate electromagnetic clutch mechanism 8. The electromagnetic clutch mechanism 8 has a plurality of clutch plates (not shown) that are frictionally engaged with each other or disengaged from each other. When a drive force distribution controller (ECU) 12 supplies an electromagnetic coil L0 (refer to FIG. 2), which is incorporated in the electromagnetic clutch mechanism 8, with a current corresponding to a current command value, the clutch plates are frictionally engaged with each other to transmit torque to the rear wheels 11. In this way, the four-wheel-drive vehicle 1 enters the four-wheel-drive mode. On the other hand, when the ECU 12 stops supplying the electromagnetic coil L0 incorporated in the electromagnetic clutch mechanism 8 with a current corresponding to a current command value, the clutch plates are disengaged from each other. As a result, transmission of torque to the rear wheels 11 is shut off. In this way, the four-wheel-drive vehicle 1 enters the front-wheel-drive mode, that is, the two-wheel-drive mode.

The frictional engaging force with which the clutch plates are frictionally engaged with each other is adjusted according to the amount (magnitude) of current that is supplied, in accordance with a current command value, to the electromagnetic coil L0 of the electromagnetic clutch mechanism 8. Thus, the torque that is transmitted to the rear wheels 11, that is, the drive force distribution to the rear wheels 11 (i.e., the frictional engaging force at the electromagnetic clutch mechanism 8) is adjusted as needed. In this way, the ECU 12 selects one of the four-wheel-drive mode and the two-wheel-drive mode, and controls, in the four-wheel-drive mode, the drive force distribution ratio (torque distribution ratio) between the front wheels 6 and the rear wheels 11.

Next, the electrical configuration of the ECU 12 for controlling the torque coupling 7 will be described with reference to FIG. 2. The ECU 12 has, as its main component, a microcomputer 30 that includes a central processing unit (CPU), a random access memory (RAM), a read only memory (ROM), an I/O interface, etc. The ROM stores various control programs executed by the ECU 12, various data and maps, etc. The maps are prepared in advance using the data empirically obtained for each vehicle model, the results of given theoretical calculations, and so on. The RAM serves as a work area in which the CPU executes various calculation processes on the respective control programs stored in the ROM, including a relay abnormality detection program.

Wheel speed sensors (not shown) and a throttle angle sensor (not shown) are connected to the input side of the ECU 12 (i.e., input terminals of the I/O interface). The torque coupling 7 and an engine controller (not shown) are connected to the output side of the ECU 12 (i.e., output terminals of the I/O interface).

The wheel speed sensors are provided for the respective wheels 6, 11 and detect the speeds of the corresponding wheels 6, 11 (will hereinafter be referred to as "wheel speeds"). The throttle angle sensor is connected to a throttle valve (not shown) to detect the angle of the throttle valve, that is, the travel of an accelerator pedal (not shown) is stepped down by the driver (the accelerator operation amount). Based on the detection signals from these sensors, the microcomputer 30 of the ECU 12 determines whether the vehicle is in a steady drive (travel) state, and calculates the current command value.

Figure 2:
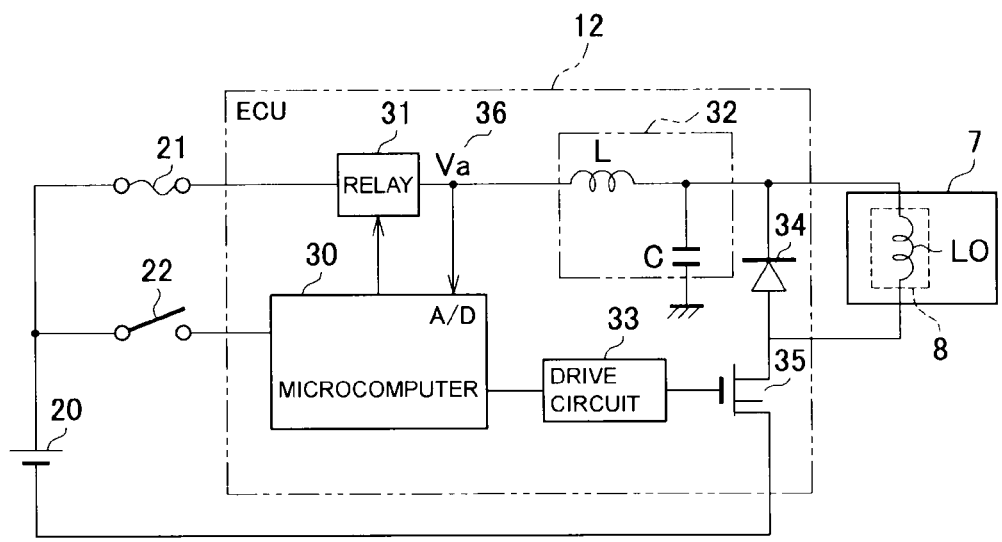
FIG. 2 is a block diagram showing the electric connections in the drive force distribution control apparatus.

As shown in FIG. 2, a series circuit constituted of a fuse 21, a relay 31, a coil L of a noise filter 32, the electromagnetic coil L0, an FET (Field Effect Transistor) 35 is connected to the battery 20. One of the terminals of a capacitor C is connected to a node at which the coil L is connected to the electromagnetic coil L0. Note that the other terminal of the capacitor C is grounded. The capacitor C and the coil L constitute the noise filter 32. A free wheel diode 34 is provided across the electromagnetic coil L0.

The microcomputer 30 is supplied with power from the battery 20 via an ignition switch (IG) 22 that serves as a power switch. When the ignition switch 22 is on and thus the microcomputer 30 is supplied with power, the microcomputer 30 executes processes of various control programs. A node 36 at which the relay 31 is connected to the coil L is connected to an A/D port of the microcomputer 30, and the microcomputer 30 detects the voltage at the node 36 (will hereinafter be referred to as "relay output voltage Vah").

Further, the microcomputer 30 outputs the current command value to a drive circuit 33. The drive circuit 33 executes on-off control (PWM control) on the FET 35 to control the amount of current that is supplied to the electromagnetic coil L0 of the electromagnetic clutch mechanism 8 in accordance with the current command value. As a result, the amount of current that is supplied to the electromagnetic coil L0 of the electromagnetic clutch mechanism 8 is controlled in accordance with the current command value, whereby the drive force distribution between the front wheels and the rear wheels is variably controlled.

Figure 3:
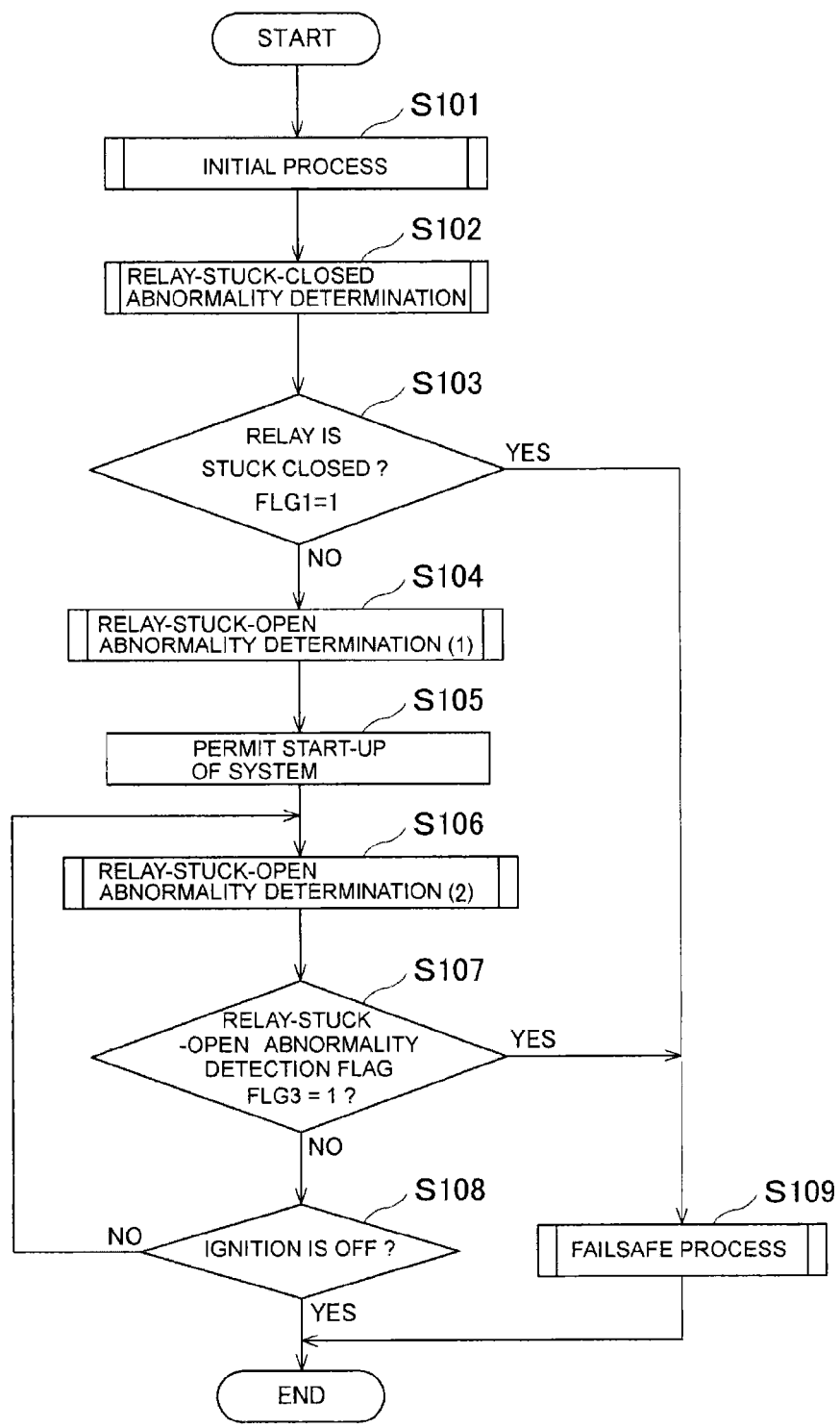
FIG. 3 is a flowchart illustrating a procedure for detecting relay abnormalities.

Next, the effects of the thus configured ECU 12 for a four-wheel-drive vehicle will be described with reference to FIGS. 3 to 7. FIG. 3 is a flowchart illustrating the relay abnormality detection program that is executed by the ECU 12 while the ignition switch 22 is on.

First, the outline of the relay abnormality detection program will be described. Note that subroutines (steps 101, 102, 104, 106, and 109) will be described later. In step 101, the ECU 12 executes an initial process that is the first to be executed after the ignition switch 22 is turned on. In the initial process, the FET 35 is turned on to cause the electric charge in the capacitor C, which constitutes the noise filter 32, to be discharged through the electromagnetic coil L0.

Next, a relay-stuck-closed abnormality determination process is executed in step 102. In the relay-stuck-closed abnormality determination process, the relay output voltage Vah is detected. If the relay output voltage Vah becomes equal to or higher than a threshold Vahs2 within a predetermined period of time, it is determined that there is an abnormality that keeps the relay 31 stuck closed (step 103: YES). In this case, a failsafe process is executed in step 109. In the failsafe process, the drive circuit 33 of the ECU 12 is controlled not to excite the electromagnetic coil L0 of the electromagnetic clutch mechanism 8, that is, to prohibit the relay 31 from being closed, so that the drive mode is switched from the four-wheel drive mode to the two-wheel drive mode.

On the other hand, if it is determined in step 103 that there is no abnormality that keeps the relay 31 stuck closed (step 103: NO), a relay-stuck-open abnormality determination process (1) is executed in step 104. In the relay-stuck-open abnormality determination process (1), the relay output voltage Vah is detected. If the relay output voltage Vah is still equal to or lower than a threshold Vahs3 even after a predetermined period of time elapses, the relay 31 is repeatedly turned on and off a predetermined number of times. Then, step 105 is executed to permit start-up of the system.

Next, a relay-stuck-open abnormality determination process (2) is executed in step 106. In the relay-stuck-open abnormality determination process (2), the relay output voltage Vah is detected when an engine speed Er is equal to or higher than a threshold Ers and the ignition switch 22 is on. If the relay output voltage Vah is still equal to or lower than the threshold Vahs3 even after a predetermined period of time elapses, it is determined that there is an abnormality that keeps the relay 31 stuck open. In this case, the failsafe process is executed in step 109.

Figure 4:
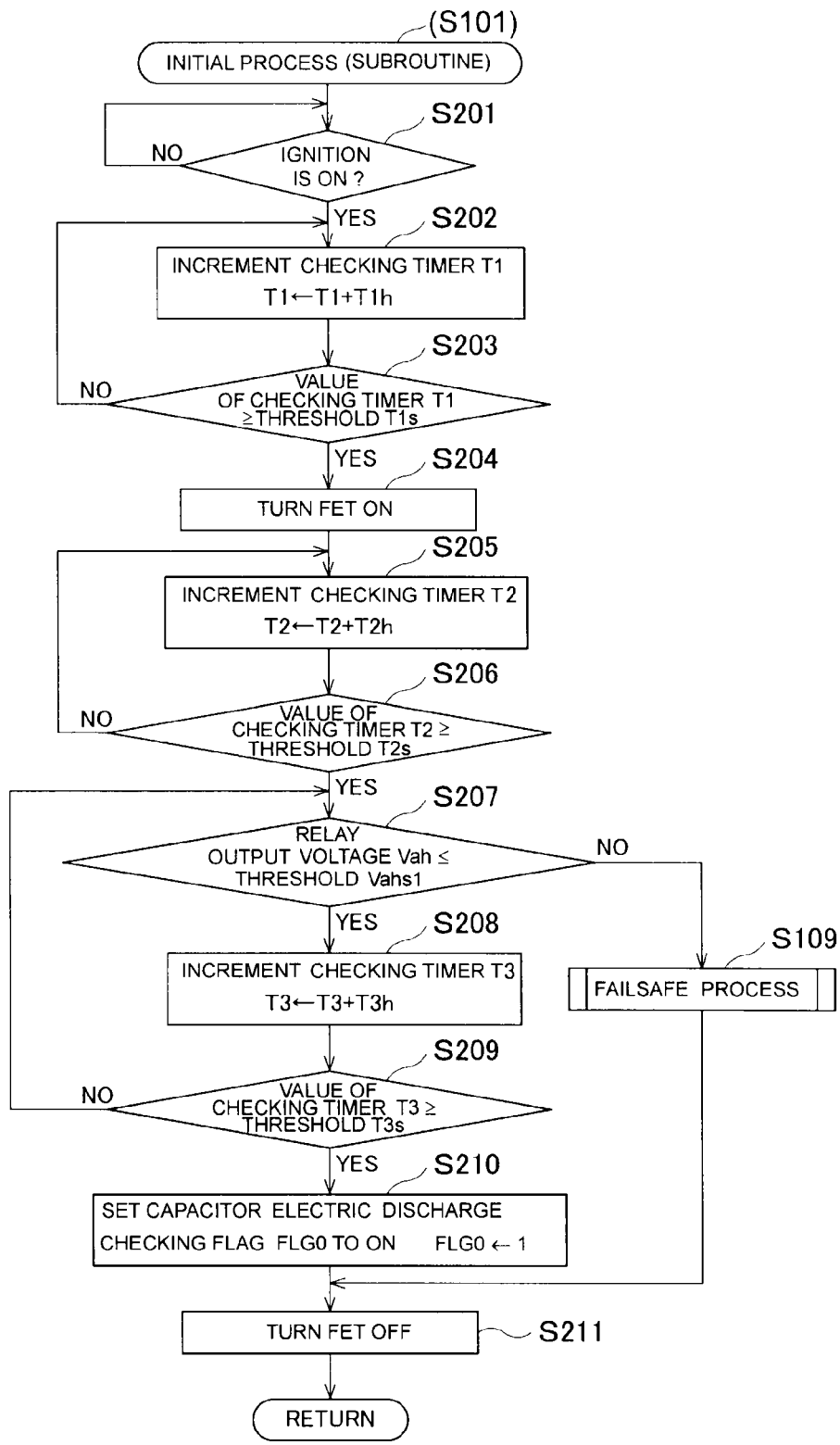
FIG. 4 is a flowchart illustrating the procedure of an initial process that is executed as a subroutine.

In the following, the subroutines of the relay abnormality detection program described above will be described in detail. First, the subroutine of the initial process (step 101) will be described with reference to FIG. 4. As shown in FIG. 4, it is first determined whether the ignition switch 22 is on (step 201). If the ignition switch 22 is off (step 201: NO), the process of step 201 is repeated until the ignition switch 22 is turned on. On the other hand, if the ignition switch 22 is on (step 201: YES), an ignition-on checking timer T1 is incremented (step 202). Then, it is determined whether the value indicated by the ignition-on checking timer T1 is equal to or larger than a threshold T1$s$ (step 203). If the value indicated by the ignition-on checking timer T1 is smaller than the threshold T1$s$ (step 203: NO), the control returns to step 202. On the other hand, if the value indicated by the ignition-on checking timer T1 is equal to or larger than the threshold T1$s$ (step 203: YES), the control proceeds to step 204.

In step 204, the FET 35 is turned on. Then, an FET-on checking timer T2 is incremented (step 205). Next, it is determined whether the value indicated by the FET-on checking timer T2 is equal to or larger than a threshold T2$s$ (step 206). If the value indicated by the FET-on checking timer T2 is smaller than the threshold T2$s$ (step 206: NO), the control returns to step 205. If the value indicated by the FET-on checking timer T2 is equal to or larger than the threshold T2$s$ (step 206: YES), on the other hand, the control proceeds to step 207.

In step 207, it is determined whether the relay output voltage Vah is equal to or lower than a threshold Vahs1. If the relay output voltage Vah is equal to or lower than the threshold Vahs1 (step 207: YES), a relay-output-voltage checking timer T3 is incremented (step 208). Then, it is determined whether the value indicated by the relay-output-voltage checking timer T3 is equal to or larger than a threshold T3$s$ (step 209). If the value indicated by the relay-output-voltage checking timer T3 is smaller than the threshold T3$s$ (step 209: NO), the control returns to step 207. On the other hand, if the value indicated by the relay-output-voltage checking timer T3 is equal to or larger than the threshold T3$s$ (step 209: YES), the control proceeds to step 210.

In step 210, a capacitor electric discharge checking flag FLG0 is set to ON (FLG0=1). Then, the FET 35 is turned off in step 211, after which the subroutine of the initial process in S101 is finished. On the other hand, if it is determined in step 207 that the relay output voltage Vah is higher than the threshold Vahs1 (step 207: NO), the failsafe process (step 109) is executed, after which the control proceeds to step 211.

Figure 5:
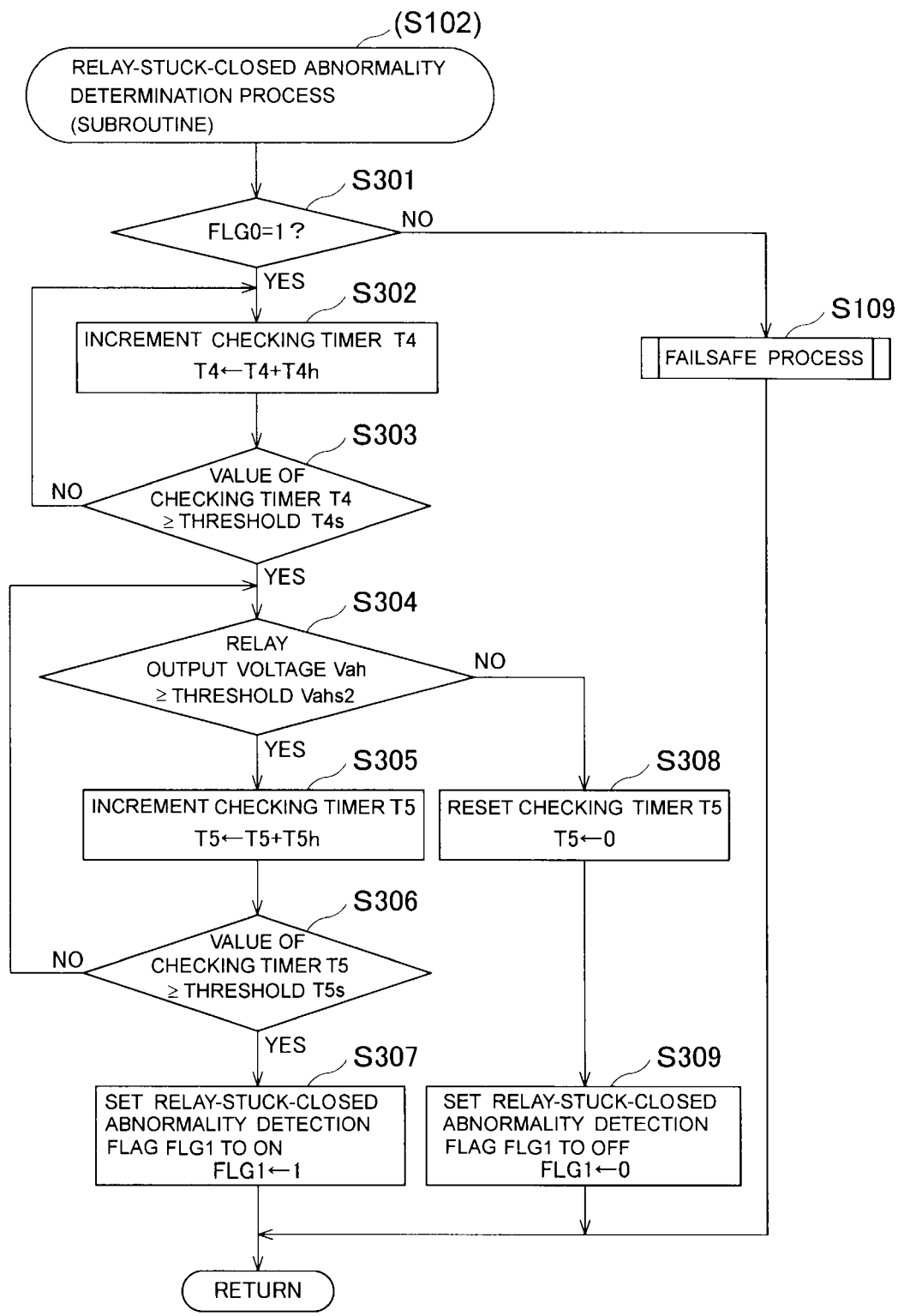
FIG. 5 is a flowchart illustrating the procedure of a relay-stuck-closed abnormality determination process that is executed as a subroutine.

Next, the subroutine of the relay-stuck-closed determination process (step 102) is executed as illustrated in FIG. 5. As shown in FIG. 5, it is first determined whether the value of the capacitor electric discharge checking flag FLG0 is 1 (step 301). If the value of the capacitor electric discharge checking flag FLG0 is 1 (step 301: YES), a FLG0-value checking timer T4 is incremented (step S302). Then, it is determined whether the value of the FLG0-value checking timer T4 is equal to or larger than a threshold T4$s$ (step 303). If the value of the FLG0-value checking timer T4 is smaller than the threshold T4$s$ (step 303: NO), the control returns to step 302. On the other hand, if the value of the FLG0-value checking timer T4 is equal to or larger than the threshold T4$s$ (step 303: YES), the control proceeds to step 304.

In step 304, it is determined whether the relay output voltage Vah is equal to or higher than the threshold Vahs2. If the relay output voltage Vah is equal to or higher than the threshold Vahs2 (step 304: YES), a relay-output-voltage checking timer T5 is incremented (step 305). Then, it is determined whether the value indicated by the relay-output-voltage checking timer T5 is equal to or larger than a threshold T5$s$ (step 306). If the value indicated by the relay-output-voltage checking timer T5 is smaller than the threshold T5$s$ (step 306: NO), the control returns to step 304. On the other hand, if the value indicated by the relay-output-voltage checking timer T5 is equal to or larger than the threshold T5$s$ (step 306: YES), the control proceeds to step 307.

In step 307, a relay-stuck-closed abnormality detection flag FLG1 is set to ON (FLG1=1), after which the subroutine of the relay-stuck-closed abnormality determination process in step102 is finished. On the other hand, if it is determined in step 304 that the relay output voltage Vah is lower than the threshold Vahs2 (step 304: NO), the relay-output-voltage checking timer T5 is reset in step 308, and then the relay-stuck-closed abnormality detection flag FLG1 is set to OFF (FLG1=0), after which the subroutine of the relay-stuck-closed abnormality determination process in step 102 is finished. If it is determined in step 301 that the value of the capacitor electric discharge checking flag FLG0 is not 1 (step 301: NO), the failsafe process (step 109) is executed, after which the subroutine of the relay-stuck-closed abnormality determination process in step102 is finished.

Figure 6:
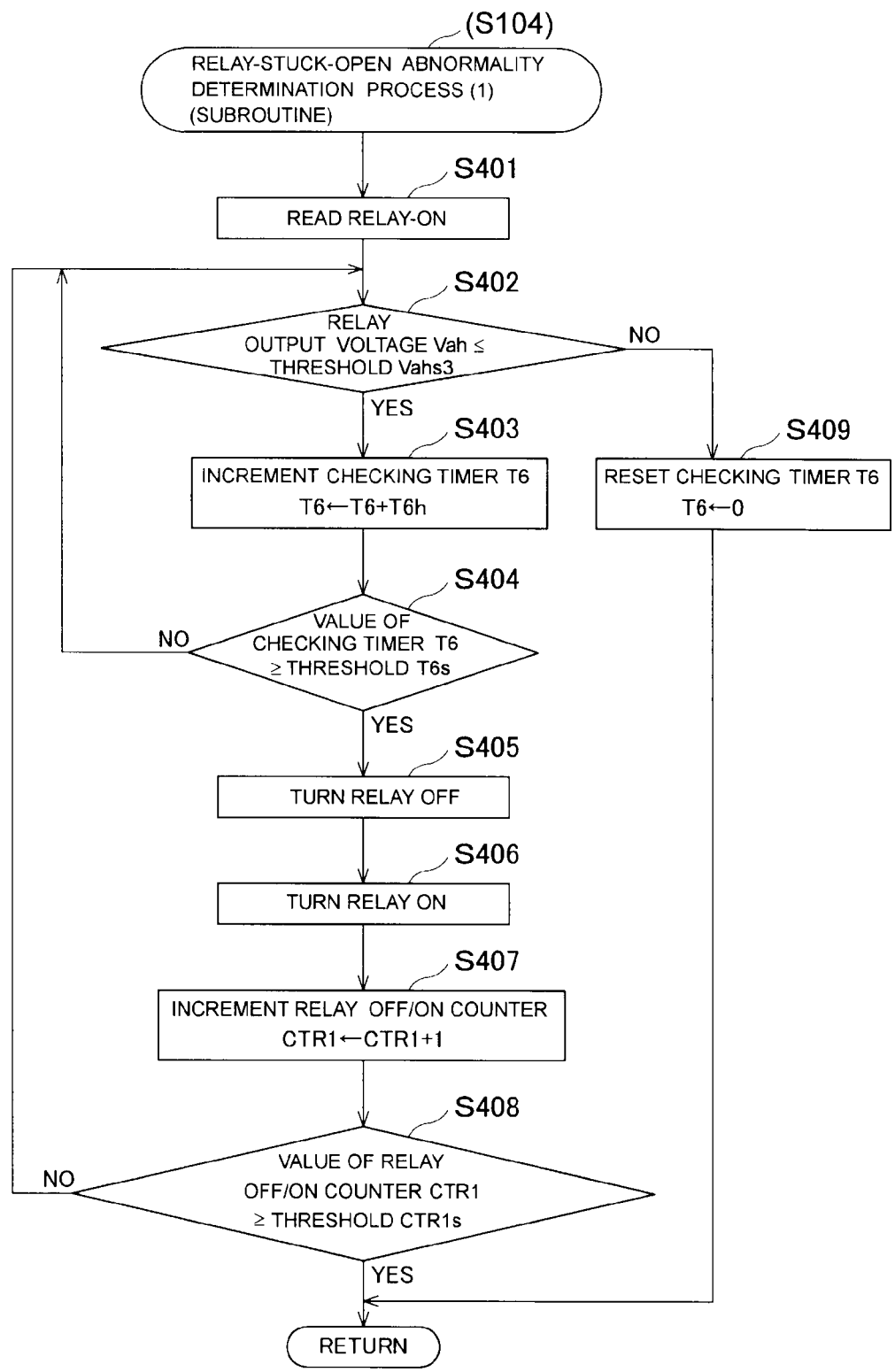
FIG. 6 is a flowchart illustrating the procedure of a relay-stuck-open abnormality determination process (1) that is executed as a subroutine.

Next, the subroutine of the relay-stuck-open abnormality determination process (1) in step 104 is executed as illustrated in FIG. 6. As shown in FIG. 6, the fact that the relay is on is read (step 401). Then, it is determined whether the relay output voltage Vah is equal to or lower than the threshold Vahs3 (step 402). If the relay output voltage Vah is equal to or lower than the threshold Vahs3 (step 402: YES), a relay-output-voltage checking timer T6 is incremented (step 403). Then, it is determined whether the value indicated by the relay-output-voltage checking timer T6 is equal to or larger than a threshold T6$s$ (step 404). If the value indicated by the relay-output-voltage checking timer T6 is smaller than the threshold T6$s$ (step 404: NO), the control returns to step 402. On the other hand, if the value indicated by the relay-output-voltage checking timer T6 is equal to larger than the threshold T6$s$ (step 404: YES), the control proceeds to step 405.

In step 405, the relay 31 is turned off. Then, the control proceeds to step 406 to turn the relay 31 on. Then, a relay off/on counter CTR1 is incremented in step 407. Next, it is determined whether the value indicated by the relay off/on counter CTR1 is equal to or larger than a threshold CTR1$s$ (step 408). If the value indicated by the relay off/on counter CTR1 is equal to or larger than the threshold CTR1$s$ (step 408: YES), the subroutine of the relay-stuck-open abnormality determination process (1) in step 104 is finished. On the other hand, if the value indicated by the relay off/on counter CTR1 is smaller than the threshold CTR1$s$ (step 408: NO), the control returns to step 402. On the other hand, if it is determined in step 402 that the relay output voltage Vah is higher than the threshold Vahs3 (step 402: NO), the relay-output-voltage checking timer T6 is reset (T6=0) (step 409), after which the subroutine of the relay-stuck-open abnormality determination process (1) in step 104 is finished.

Next, referring back to FIG. 3, step 105 is executed to permit start-up of the system, and then the control proceeds to step 106. In step 106, the relay-stuck-open abnormality determination process (2) is executed.

Figure 7:
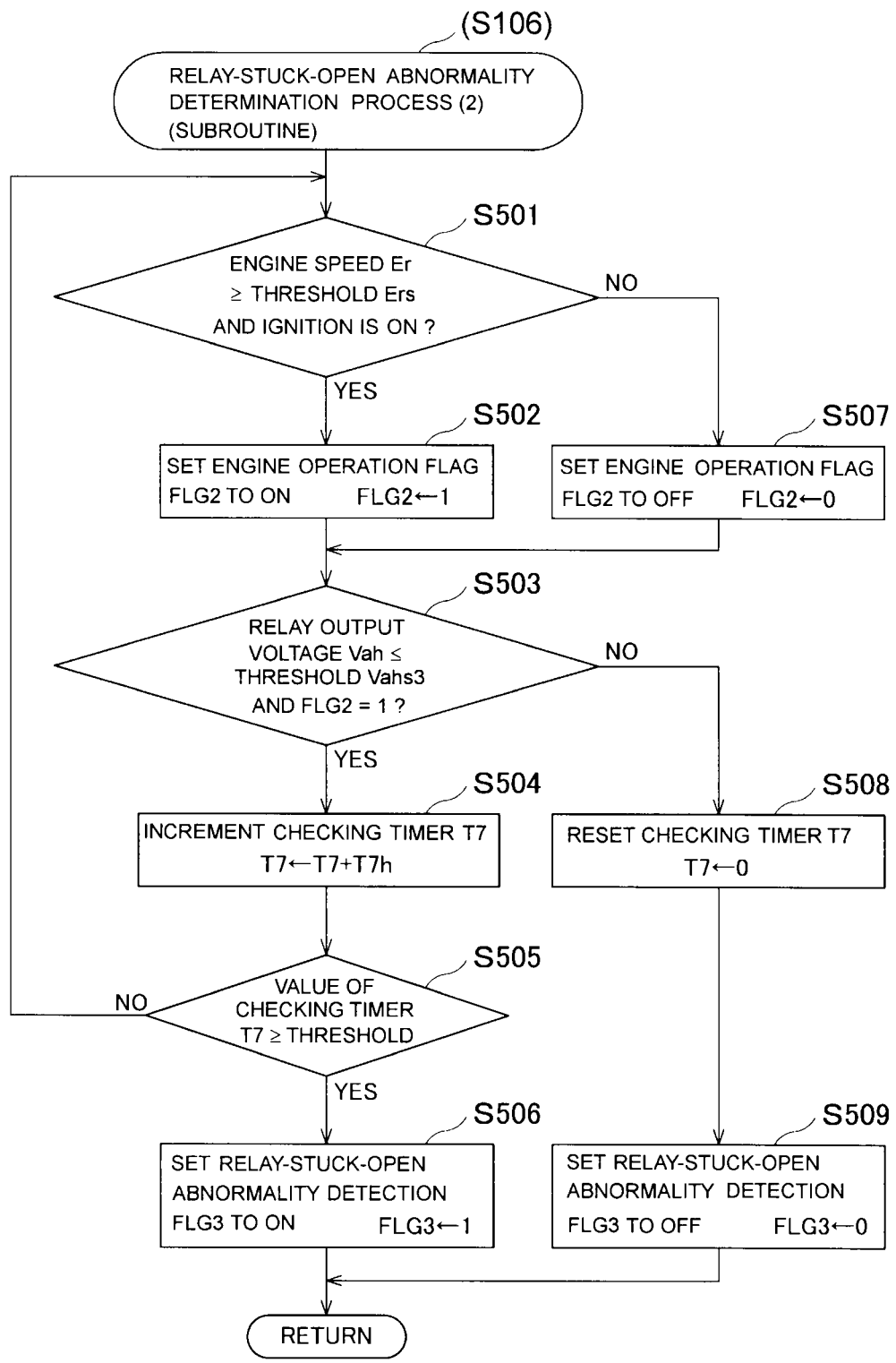
FIG. 7 is a flowchart illustrating the procedure of a relay-stuck-open abnormality determination process (2) that is executed as a subroutine.

Hereinafter, the subroutine of the relay-stuck-open abnormality determination process (2) in step 106 will be described with reference to FIG. 7. As shown in FIG. 7, it is first determined whether the engine speed Er is equal to or higher than the threshold Ers and the ignition switch 22 is on (step 501). If the engine speed Er is equal to or higher than the threshold Ers and the ignition switch 22 is on (step 501: YES), an engine operation flag FLG2 is set to ON (FLG2=1), and then the control proceeds to step 503. In step 503, it is determined whether the relay output voltage Vah is equal to or lower than the threshold Vahs3 and the value of the engine operation flag FLG2 is 1.

If the relay output voltage Vah is equal to or lower than the threshold Vahs3 and the value of the engine operation flag FLG2 is 1 (step 503: YES), a relay-output-voltage checking timer T7 is incremented (step 504). Then, it is determined whether the value indicated by the relay-output-voltage checking timer T7 is equal to or larger than a threshold T7s (step 505). If the value indicated by the relay-output-voltage checking timer T7 is smaller than the threshold T7s (step 505: NO), the control returns to step 501. On the other hand, if the value indicated by the relay-output-voltage checking timer T7 is equal to or larger than the threshold T7s (step 505: YES), the control proceeds to step 506 to set a relay-stuck-open abnormality detection flag FLG3 to ON (FLG3=1), after which the subroutine of the relay-stuck-open abnormality determination process (2) in step 106 is finished.

On the other hand, if it is determined in step 503 that the relay output voltage Vah is higher than the threshold Vahs3 and/or the value of the engine operation flag FLG2 is not 1 (step 503: NO), the relay-output-voltage checking timer T7 is reset (T7=0) (step 508), and then the control proceeds to step 509. In step 509, the relay-stuck-open abnormality detection flag FLG3 is set to OFF (FLG3=0), after which the subroutine of the relay-stuck-open abnormality determination process (2) in step 106 is finished.

In contrast, if it is determined in step 501 that the engine speed Er is lower than the threshold Ers and/or the ignition switch 22 is not on (step 501: NO), the engine operation flag FLG2 is set to OFF (FLG2=0) (step 507), and then the control proceeds to step 503. At this time, since the value of the engine operation flag FLG2 is not 1 (step 503: NO), the control proceeds to step 508. In step 508, the relay-output-voltage checking timer T7 is reset (T7=0), and then the control proceeds to step 509. In step 509, the relay-stuck-open abnormality detection flag FLG3 is set to OFF (FLG3=0), after which the subroutine of the relay-stuck-open abnormality determination process (2) in step 106 is finished.

Next, referring back to FIG. 3, it is determined in step 107 whether the value indicated by the relay-stuck-open abnormality detection flag FLG3 is 1. If the value indicated by the relay-stuck-open abnormality detection flag FLG3 is 1 (step 107: YES), the failsafe process is executed in step 109 to switch the drive mode from the four-wheel-drive mode to the two-wheel-drive mode, after which the relay abnormality detection program is finished. On the other hand, if the value indicated by the relay-stuck-open abnormality detection flag FLG3 is not 1 (step 107: NO), the control proceeds to step 108 to determine whether the ignition switch 22 is off. If the ignition switch 22 is not off (step 108: NO), the control returns to step 106. On the other hand, if the ignition switch 22 is off (step 108: YES), the relay abnormality detection program is finished.

Thus, the example embodiment described above provides the following operations and effects. The microcomputer 30 detects the voltage Va at the node 36 between the relay 31 and the coil (inductance) L. After the relay 31 is turned on, the relay output voltage Vah is compared with the threshold Vahs3. At this time, if the relay output voltage Vah is equal to or lower than the threshold Vahs3, it is then determined whether the relay output voltage Vah increases above the threshold Vahs3 while repeatedly turning the relay 31 on and off multiple times. If the relay output voltage Vah has increased above the threshold Vahs3, the relay 31 is determined as being in a normal state. On the other hand, if the relay output voltage Vah remains equal to or lower than the threshold Vahs3, the engine speed Er of the engine 2, which rotates the power generator that supplies power to the battery 20, is checked. If the engine speed Er is equal to or higher than the threshold Ers and the ignition switch 22 is on but the relay output voltage Vah is equal to or lower than the threshold Vahs3, it is determined that a sufficient amount of power is supplied to the battery 20 and therefore there is an abnormality that keeps the relay 31 stuck open.

That is, when the relay 31 is in a normal state (a state free of any abnormality that keeps the relay 31 stuck open), even if the detected relay output voltage Vah does not meet the condition on its level, due to temporary decrease in the voltage of the battery 20, after the relay 31 is repeatedly and successively turned on and off multiple times, it is not immediately determined that there is an abnormality that keeps the relay 31 stuck open. That is, after this, the engine speed Er of the engine 2, which rotates the power generator that supplies power to the battery 20, is checked. At this time, if the engine speed Er is normal but the relay output voltage Vah does not yet meet the condition on its level, it is determined that there is an abnormality that keeps the relay 31 stuck open.

With the structure described above, even in a case where the relay output voltage Vah detected after the relay 31 is repeatedly and successively turned on and off multiple times does not meet the condition on its level, whether there is an abnormality that keeps the relay 31 stuck open is determined based on the condition on an increase in the output voltage of the relay 31, as another condition on the output voltage of the relay 31. Therefore, even when the voltage of the battery 20 is temporarily low, it is not erroneously determined that there is an abnormality that keeps the relay 31 stuck open, thus preventing the drive mode from being unnecessarily switched from the four-wheel-drive mode to the two-wheel-drive mode. Therefore, it is possible to prevent reduction in the stability of traveling (driving) of the vehicle.

Meanwhile, for example, the example embodiment described above may be modified as follows. While the drive force distribution control apparatus according to the example embodiment is structured for vehicles that use the front wheels as the main drive wheels, the invention may be embodied also as a drive force distribution control apparatus for vehicles that use the rear wheels as the main drive wheels. Further, the invention may be embodied not only as drive force distribution control apparatuses but also as various other apparatuses, systems, and the like, in which power is generated using the drive force of an engine and then supplied to a battery and a relay is controlled.

What is claimed is:

1. A drive force distribution control apparatus comprising:
a battery that supplies power that is generated by a power generator rotated by a drive force generated by an engine;
an ignition switch that selectively allows and interrupts a supply of the power from the battery;
a relay that selectively allows the power supplied from the battery to be transmitted to a drive system and interrupts transmission of the power supplied from the battery to the drive system;
relay-output-voltage detecting means for detecting a relay output voltage that is a voltage on an output side of the relay; and
abnormality-determining means for determining whether there is an abnormality of the relay, based on the relay output voltage detected by the relay-output-voltage detecting means; and
drive-mode-switching means for switching a drive mode between a four-wheel-drive mode and a two-wheel-drive mode,
wherein when the relay output voltage detected by the relay-output-voltage detecting means is equal to or lower than a predetermined voltage threshold, the abnormality-determining means repeatedly and successively turns the relay on and off multiple times, and
wherein the abnormality-determining means determines whether a speed of the engine is equal to or higher than a predetermined engine speed threshold and the ignition switch is on, and if the speed of the engine is equal to or higher than the predetermined engine speed threshold and the ignition switch is on and the relay output voltage detected by the relay-output-voltage detecting means is still equal to or lower than the predetermined voltage threshold, the abnormality-determining means determines that there is an abnormality that keeps the relay stuck open, and then switches, using the drive-mode-switching means, the drive mode from the four-wheel-drive mode to the two-wheel-drive mode.

2. The drive force distribution control apparatus of claim 1, further comprising a relay-output-voltage checking timer,
wherein the abnormality-determining means determines whether that the speed of the engine is equal to or higher than the predetermined engine speed threshold and the ignition switch is on and the relay output voltage detected by the relay-output-voltage detecting means is equal to or lower than the predetermined voltage threshold, then the relay-output-voltage checking timer is incremented, and then the abnormality-determining means determines if the relay-output-voltage checking timer is equal to or greater than a predetermined timing threshold, then the abnormality-determining means determines that the abnormality keeps the relay stuck open, and then switches, using the drive-mode-switching means, the drive mode from the four-wheel-drive mode to the two-wheel-drive mode.

3. A drive force distribution control apparatus comprising:
a battery that supplies power that is generated by a power generator rotated by a drive force generated by an engine;
an ignition switch that selectively allows and interrupts a supply of the power from the battery;
a relay that selectively allows the power supplied from the battery to be transmitted to a drive system and interrupts transmission of the power supplied from the battery to the drive system; and
circuitry configured to
detect a relay output voltage that is a voltage on an output side of the relay;
determine whether there is an abnormality of the relay, based on the relay output voltage detected; and
switch a drive mode between a four-wheel-drive mode and a two-wheel-drive mode,
wherein when the relay output voltage is equal to or lower than a predetermined voltage threshold, the circuitry is configured to turn the relay on and off multiple times, and
wherein the circuitry is configured to determine whether a speed of the engine is equal to or higher than a predetermined engine speed threshold and the ignition switch is on, and if the circuitry determines that the speed of the engine is equal to or higher than the predetermined engine speed threshold and the ignition switch is on and the relay output voltage detected is still equal to or lower than the predetermined voltage threshold, the circuitry is configured to determine that there is an abnormality that keeps the relay stuck open, and the circuitry switches the drive mode from the four-wheel-drive mode to the two-wheel-drive mode.

4. The drive force distribution control apparatus of claim 3, further comprising a relay-output-voltage checking timer,
wherein the circuitry configured to determine the speed of the engine is equal to or higher than the predetermined engine speed threshold and the ignition switch is on and the relay output voltage detected is equal to or lower than the predetermined voltage threshold, the circuitry is configured to increment the relay-output-voltage checking timer, and then the circuitry configured to determine if the relay-output-voltage checking timer is equal to or greater than a predetermined timing threshold, then the circuitry is configured to determine that the abnormality keeps the relay stuck open, and the circuitry switches the drive mode from the four-wheel-drive mode to the two-wheel-drive mode.

* * * * *